(12) United States Patent
Schier et al.

(10) Patent No.: US 9,936,373 B2
(45) Date of Patent: Apr. 3, 2018

(54) DISCOVERY SIGNALS IN HETEROGENEOUS WIRELESS NETWORKS

(71) Applicant: ZTE Wistron Telecom AB, Stockholm (SE)

(72) Inventors: Thorsten Schier, Stockholm (SE); Patrick Svedman, Stockholm (SE); Aijun Cao, Stockholm (SE); Yonghong Gao, Stockholm (SE); Jan Johansson, Norrfjärden (SE); Bojidar Hadjiski, Stockholm (SE)

(73) Assignee: ZTE Wistron Telecom AB, Stockholm (SE)

( * ) Notice: Subject to any disclaimer, the term of this patent is extended or adjusted under 35 U.S.C. 154(b) by 91 days.

(21) Appl. No.: 15/024,836

(22) PCT Filed: Sep. 25, 2014

(86) PCT No.: PCT/SE2014/051099
§ 371 (c)(1),
(2) Date: Mar. 24, 2016

(87) PCT Pub. No.: WO2015/047171
PCT Pub. Date: Apr. 2, 2015

(65) Prior Publication Data
US 2016/0219425 A1 Jul. 28, 2016

Related U.S. Application Data

(60) Provisional application No. 61/882,523, filed on Sep. 25, 2013.

(51) Int. Cl.
*H04W 8/00* (2009.01)
*H04W 72/04* (2009.01)
(Continued)

(52) U.S. Cl.
CPC ......... *H04W 8/005* (2013.01); *H04L 27/2601* (2013.01); *H04W 52/244* (2013.01); *H04W 72/04* (2013.01)

(58) Field of Classification Search
CPC .. H04W 8/005; H04W 52/244; H04L 27/2601
(Continued)

(56) References Cited

U.S. PATENT DOCUMENTS 9,258,786 B2 2/2016 Cao et al.
9,357,528 B2 5/2016 Gao et al.
(Continued)

FOREIGN PATENT DOCUMENTS

EP 2 187 553 A1 5/2010
EP 2 282 581 A1 2/2011
(Continued)

OTHER PUBLICATIONS

3GPP Technical Specification, "3rd Generation Partnership Project; Technical Specification Group Radio Access Network; Evolved Universal Terrestrial Radio Access (E-UTRA); Multiplexing and channel coding (Release 10)," TS 36.212 v 10.6.0, 79 pages, Jun. 2012.
(Continued)

*Primary Examiner* — Gary Mui
(74) *Attorney, Agent, or Firm* — Perkins Coie LLP (57) ABSTRACT

In a heterogeneous network deployment that includes a macro base station and one or more low power nodes, a discovery signal is transmitted to facilitate the identification of low power nodes. The discovery signal is transmitted on a selected subset of resource elements, previously unused, to maintain backward compatibility with legacy user equipment. The transmission sequence and/or the locations of resource elements used for transmitting the discovery signal can identify the low power node to a user equipment.

15 Claims, 6 Drawing Sheets

(51) Int. Cl.
*H04W 52/24* (2009.01)
*H04L 27/26* (2006.01)

(58) Field of Classification Search
USPC .................................................. 370/310–350
See application file for complete search history.

(56) References Cited

U.S. PATENT DOCUMENTS

| | | | |
|---|---|---|---|
| 2001/0024430 A1 | 9/2001 | Sekine et al. | |
| 2003/0220765 A1 | 11/2003 | Overy et al. | |
| 2007/0254626 A1 | 11/2007 | Ahlgren | |
| 2009/0135761 A1* | 5/2009 | Khandekar | H04L 5/0053 370/328 |
| 2010/0008346 A1 | 1/2010 | Shirakata et al. | |
| 2010/0167743 A1* | 7/2010 | Palanki | H04B 7/155 455/436 |
| 2010/0182903 A1 | 7/2010 | Palanki et al. | |
| 2010/0302978 A1* | 12/2010 | Roh | H04B 7/024 370/310 |
| 2010/0315967 A1 | 12/2010 | Patel et al. | |
| 2011/0047029 A1 | 2/2011 | Nair et al. | |
| 2011/0053604 A1 | 3/2011 | Kim | |
| 2011/0081927 A1 | 4/2011 | Gerstenberger et al. | |
| 2012/0028673 A1 | 2/2012 | Jeong | |
| 2012/0046026 A1 | 2/2012 | Chande et al. | |
| 2012/0142334 A1 | 6/2012 | Sato et al. | |
| 2012/0188897 A1 | 7/2012 | Shen | |
| 2012/0213109 A1 | 8/2012 | Xu et al. | |
| 2013/0142291 A1 | 6/2013 | Dinan | |
| 2013/0210431 A1 | 8/2013 | Abe et al. | |
| 2013/0265981 A1 | 10/2013 | Yang et al. | |
| 2013/0272188 A1* | 10/2013 | Seo | H04B 7/15557 370/315 |
| 2014/0064211 A1 | 3/2014 | Cao et al. | |
| 2014/0092861 A1 | 4/2014 | Gao et al. | |
| 2014/0119264 A1 | 5/2014 | Shauh et al. | |
| 2014/0133337 A1 | 5/2014 | Lee et al. | |
| 2015/0029877 A1* | 1/2015 | Chen | H04W 48/16 370/252 |
| 2015/0326335 A1* | 11/2015 | Chen | H04J 11/0079 370/252 |
| 2016/0088495 A1 | 3/2016 | Cao et al. | |
| 2016/0234878 A1* | 8/2016 | Svedman | H04W 68/005 |
| 2017/0288837 A1* | 10/2017 | Namgoong | H04L 5/0007 |

FOREIGN PATENT DOCUMENTS

| | | |
|---|---|---|
| EP | 2448 338 A1 | 5/2012 |
| EP | 2 523 510 A1 | 11/2012 |
| JP | 2005-123898 A | 12/2005 |
| JP | 2008-035079 A | 2/2008 |
| JP | 2009-089186 A | 4/2009 |
| JP | 2011-009866 A | 1/2011 |
| JP | 2011-142550 A | 7/2011 |
| JP | 2012-039168 A | 2/2012 |
| JP | 2012-138967 A | 7/2012 |
| JP | 2013-038818 A | 2/2013 |
| WO | 2005/055462 A1 | 6/2005 |
| WO | 2009/064700 A2 | 5/2009 |
| WO | 2011/018906 A1 | 2/2011 |
| WO | 2011/103475 A1 | 8/2011 |
| WO | 2013/009052 A2 | 1/2013 |
| WO | 2013/120265 A1 | 8/2013 |
| WO | 2013/137700 A1 | 9/2013 |
| WO | 2014/182230 A1 | 11/2014 |

OTHER PUBLICATIONS

3GPP Technical Specification, "3rd Generation Partnership Project; Technical Specification Group Radio Access Network; Evolved Universal Terrestrial Radio Access (E-UTRA); Physical Channels and Modulation (Release 10)," TS 36.211 v 10.5.0, 101 pages, Jun. 2012.
3rd Generation Partnership Project, "Technical Specification Group Radio Access Network; Physical layer procedures (FDD) (Release 11)," 3GPP TS 25.214 v11.2.0, 108 pages, Jun. 2012.
Fujitsu, "Enhancement of existing mechanism for operational carrier selection," 3GPP TSG-RAN WG3 #76, R3-121306, 3 pages, May 2012.
Fujitsu, "Signalling enhancement for the operational carrier selection," 3GPP TSG-RAN WG3 #75bis, R3-120640, 3 pages, Mar. 2012.
International Search Report and Written Opinion dated Feb. 3, 2015 for International Application No. PCT/SE2014/051099, filed on Sep. 25, 2014 (15 pages).
International Search Report and Written Opinion dated Sep. 22, 2014 for International Application No. PCT/SE2014/050558, filed on May 7, 2014 (14 pages).
Japanese Office Action dated Jul. 29, 2014 for Japanese Application No. 2013-178248, filed Aug. 29, 2013, with English translation (8 pages).
Japanese Office Action dated Nov. 15, 2016 for Japanese Application No. 2016-512876, filed May 7, 2014, with English translation (9 pages).
UK Search and Examination Report dated Jan. 30, 2014 for UK Patent Application No. 1315301.0, filed Aug. 28, 2013 (6 pages).
Zte, "RE Mapping for Small Cell Discovery Signal Based on Unused REs," 3GPP TSG-RAN WG1 #73, R1-132084, 5 pages, May 2013.
Japanese Office Action dated Jun. 20, 2017 for Japanese Application No. 2016-512876, filed May 7, 2014, with English translation (6 pages).
Japanese Office Action dated Jun. 6, 2017 for Japanese Application No. 2016-517539, filed Sep. 25, 2014, with English translation (13 pages).

* cited by examiner

DISCOVERY SIGNALS IN HETEROGENEOUS WIRELESS NETWORKS

CROSS-REFERENCE TO RELATED APPLICATIONS

This patent document claims the benefit of priority of U.S. Provisional Patent Application No. 61/882,523, filed Sep. 25, 2013. The entire content of the before-mentioned patent application is incorporated by reference herein.

BACKGROUND

This document relates to cellular telecommunication systems, especially to a heterogeneous network where one or more low-power nodes are deployed in a macro base station's coverage.

Cellular communication systems are being deployed all over the world to provide not only voice services, but also mobile broadband data and multimedia services. There is an ever-growing need for higher bandwidth because new mobile applications are continuously being released that consume higher and higher amount of data, e.g., for video and graphics. As mobile system operators deploy these bandwidth-hungry applications and increase the geographic areas covered by broadband mobile services, there is an ongoing need to cover every square inch of an operator's coverage area with high bandwidth connectivity.

SUMMARY

This document describes technologies, among other things, for transmitting or receiving discovery signals. In one embodiment, the discovery signals facilitate low power nodes in a heterogeneous network to uniquely identify themselves, even in the presence of other low power nodes and legacy user equipment. In another embodiment, different nodes might also transmit the same discovery signal. Then, the nodes would not be uniquely identified but the discovery signal would function as a beacon to indicate the presence of small cells. This might be useful for example to design new power efficient inter-frequency measurements.

In one aspect, methods, systems and apparatus are disclosed for transmitting a discovery signal in a heterogeneous wireless communication network for advertising self-identity, implementable at a low power node are disclosed. The techniques include selecting a combination of a transmission sequence and transmission resource elements (REs) such that the selected combination identifies the low power node in the heterogeneous wireless network. The technique also includes transmitting the transmission sequences over the transmission REs using a modulation scheme that depends on the transmission sequence.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

As the spectrum efficiency for the point-to-point link already approaches its theoretical limit, one way is to split big cells into smaller and smaller cells. When the cell becomes closer to each other, the adjacent cell interferences become more severe, the cell splitting gain saturates. Furthermore, nowadays it is more and more difficult to acquire new sites to install base stations for the operators and the costs are also higher and higher. Therefore, cell-splitting cannot automatically fulfill the bandwidth demands without further careful planning an implementation.

A signal, called Geometry Indicator (GI) signal, which is similar to presently disclosed discovery signal, can be used in heterogeneous cellular networks for a variety of purposes. In particular, in some embodiments, unused Resource Elements (REs) in a time-frequency resource plan are allocated to the carriage of GI signals in a HetNet.

There are several possible configurations for the low power nodes. For example, they could either have their own cell ID or they could share the same cell ID as the Macro node. They could also use the same frequency as the Macro or they could have their own dedicated spectrum.

While the Long term Evolution (LTE) industry standard is used for illustrating certain embodiments in this document, the disclosed techniques may also be practiced in systems that use other wireless communication standards and protocols. Furthermore, headings and subheading are used only for the benefit of a reader and are not intended to limit the scope of disclosed technology.

It is useful that the UE can detect the presence of a low power node so that it can adjust its behavior accordingly and that the network can operate efficiently. There are several challenges to overcome:

UE Power Consumption:

If an LPN is having its own cell ID, either on the same frequency as the Macro or on a dedicated frequency, then, the UE has to perform a cell detection procedure by reading the PSS/SSS from the LPN. A full cell search is power consuming. Especially in dense deployments, a simplified cell detection procedure could be beneficial. Also, the discovery signal can be utilized for efficient inter frequency measurements. One example embodiment is when a UE is served by a Macro node on a frequency f1 and somewhere within the Macro coverage area there is one low power node located. That low power node operates on another frequency f2. Then, the UE needs to perform inter frequency measurements to detect this low power node. Mostly, the UE will be far away from the coverage area of this low power node and inter-frequency measurements will be done in vain and drain the UE battery. The discovery signal of the low power nodes could be transmitted on f1 as a beacon. Then, the UE could start the inter-frequency measurements only when it has detected the beacon on f1, i.e. when the UE is close to an LPN.

Network Power Consumption.

When a node temporarily is not needed, for instance because no UEs are close to it, then, it is desirable to shut-off its transmission as possible. In 3GPP it is currently discussed to introduce a dormant state of the LPN. In this dormant state, the transmission of PSS/SSS could be shut-off. Instead, to enable UEs (or other nodes) to detect the dormant LPN, a less power consuming discovery signal is disclosed in the present document.

Interference Reduction or Detection at Low SINR:

In a dense LPN deployment, the primary/secondary synchronization signals (PSS/SSS signals) transmitted from the different nodes interfere with each other, in particular if the LPNs are synchronized. This can lead to a weak SINR measured on PSS/SSS and that the UE only detects some of the available LPNs. A discovery signal that either is detectable at low SINR or that does not create much interference to other cells is desirable.

Distinguish Between Nodes:

If the LPNs have the same cell ID, they also transmit the same PSS/SSS. In that case it is not possible to distinguish the different nodes with help of the PSS/SSS. In one aspect, the new unique identification signal disclosed in the present document could overcome this problem.

Faster Cell Identification:

According to the 3GPP specifications, a cell search (with PSS/SSS) may take up to 800 ms. For better performance in mobility, a faster identification procedure may be desirable.

The Number of Available Cell IDs is Limited.

With the introduction of a discovery signal, this limitation can be overcome.

Avoid LPN Blocking:

(especially for, but not restricted to, the co-channel scenario when the LPN is not transmitting common reference signal CRS). If a UE is close to one low power node, its uplink transmit power might be unnecessarily high before it establishes a connection with the network and lowers its transmit power by uplink power control loop. This could cause blocking.

In the current version of the LTE standard (Release 11), within one radio frame (10 ms) there are in total 40 unused REs. The REs are unused in the sense that no demodulable signals are transmitted using these REs. 20 of them are located in the first sub-frame that contains PSS/SSS and the remaining 20 are located in the second sub-frame that contains PSS/SSS.

In this document, the unused REs are separated into two sets, one set is transmitting the discovery signal and the other set contains REs that remain unused and function as a guard band to separate the new discovery signals from other signals. For convenience of description in this document, REs belonging to the first set are denoted DS-REs and REs belonging to the second set are denoted GB-REs. Different embodiments with all possible combinations of DS-REs and BG-REs can be realized.

One example embodiment uses 32 of the unused REs in one radio frame as DS-RE. In order to have less impact on the synchronization signals, the remaining 8 REs are used as GB-REs to separate the discovery signal from the PSS/SSS. These are the closest REs to the PSS/SSS, in order to be resistant to the initial frequency offset up to ±7.5 kHz during the PSS stage in the legacy cell search procedure.

Figure 1:
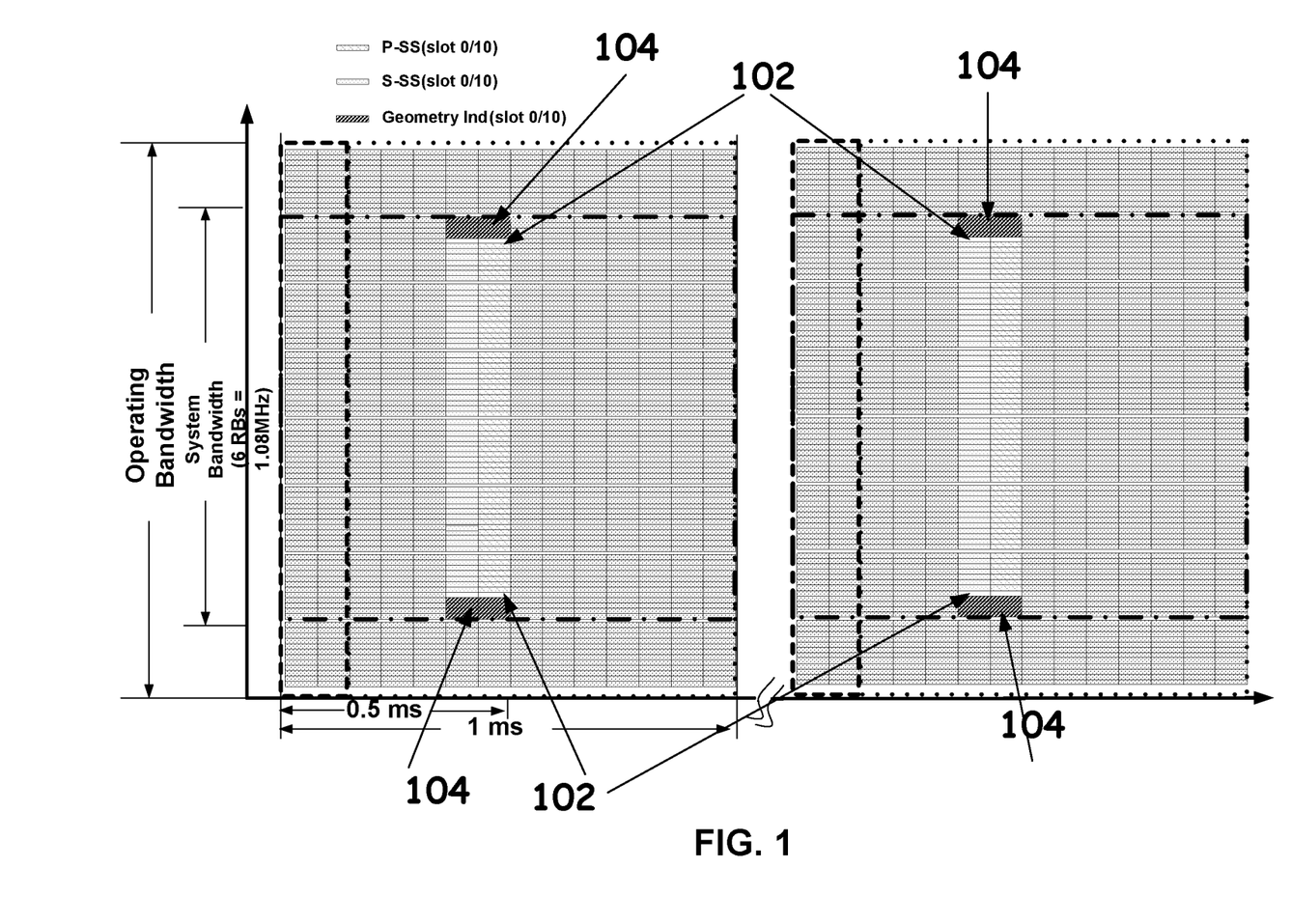
FIG. 1 depicts an example of allocation of REs to discovery signal transmissions.

FIG. 1 shows the location of the unused REs in the two sub-frames containing PSS/SSS. The white REs (102) represent the GB-REs and the dark grey REs (104) are the DS-REs.

Division of DS-REs into Basic Regions

In general, the number of available DS-REs that has been selected in an embodiment are denoted Max_DS_RE in this document. The available DS-RE can be further divided into different regions. In a general embodiment, they can be divided into N different regions, where N is a natural number between 1 and Max_DS_RE.

In one embodiment, N=1, thus, there is only one region. In another embodiment, Max_DS_RE is set to 40 and N is also set to 40, thus there are 40 different regions.

For equally large regions, the size of one region is then given by MAX_DS_RE/N. Note, that other embodiments may employ regions of different size. The same concepts apply for those embodiments.

In some embodiments, Max_DS_RE is set to 32 and N is set to 4. The previously described 32 DS-REs are divided into four equally large regions, each consisting of 8 REs. The division into regions is naturally according to their locations in the time and frequency domain within one radio-frame. The 4 regions are denoted:

Upper Left (UL),
Lower Left (LL),
Upper Right (UR)
Lower Right (LR)

Where "Upper" refers to the REs located on higher frequencies than the REs used for PSS/SSS and "Lower" refers to the REs being located on lower frequencies.

"Left" refers to the first sub-frame during a 10 ms radio-frame containing PSS/SSS and "Right" refers to the second sub-frame.

With the introduction of the 4 basic regions, each of the 32 REs gets an unique index assigned. The index consists of a region indicator and a RE indicator within the region. The region indicator is one element out of {UL,LL,UR,LR} and the RE indicator is one number between 0 and 7.

Figure 2:
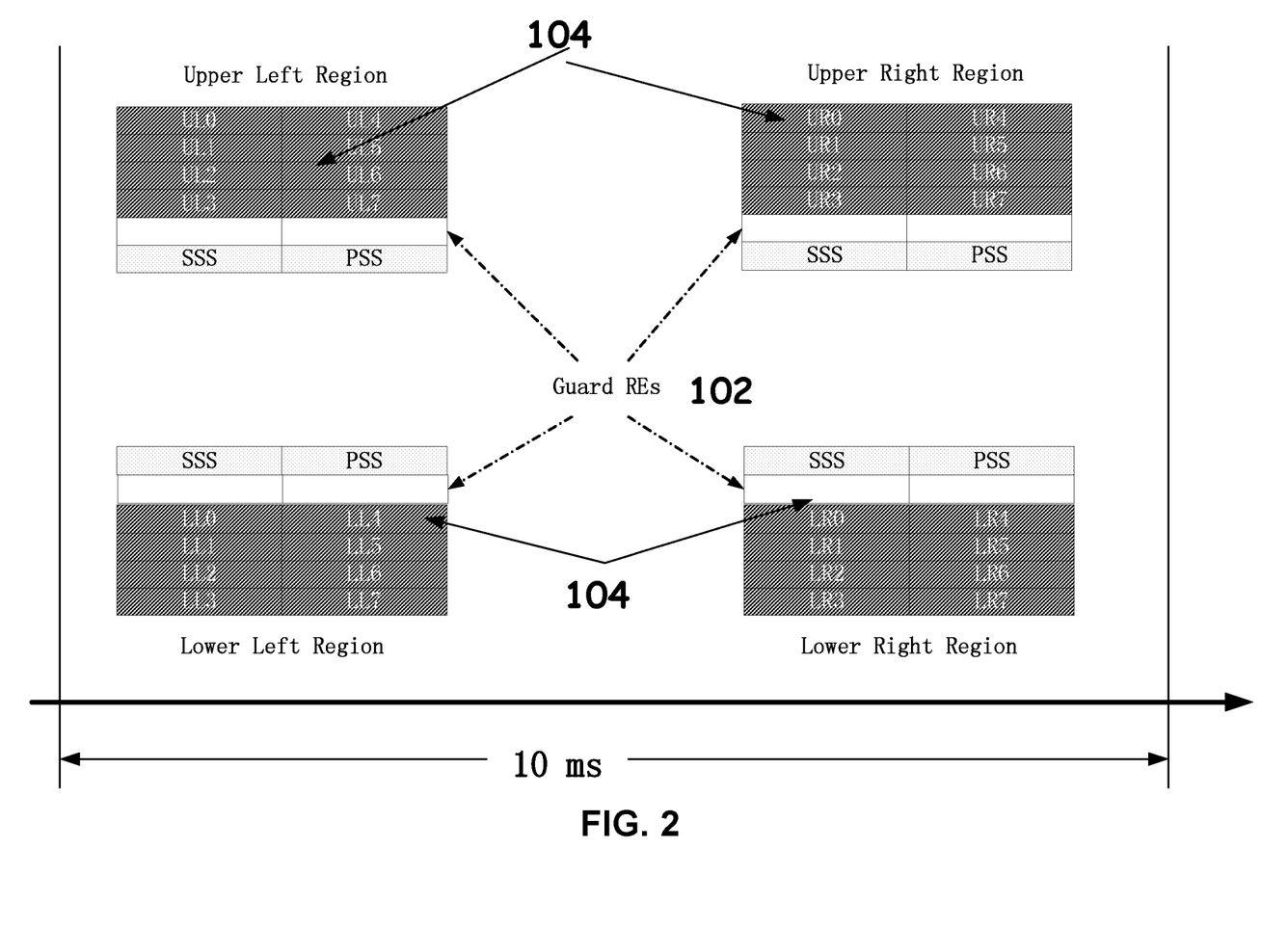
FIG. 2 depicts examples of REs allocated to discovery signals and guardband signals.

The 4 basic regions and the RE indices are shown in FIG. 2. Similar indexing can be performed for other embodiments.

Definition of Sequences to be Transmitted in the Basic Regions

For the N equally large regions, the length of region is calculated "Max_DS_RE/N".

The maximum number of mutually orthogonal sequences that can be defined within a region depends on the modulation scheme that can be employed.

In some embodiments, BPSK is used for modulation. For instance, when no channel estimation can be done, BPSK typically gives the best performance. But also in this case, it is not prohibited to have higher order modulations. In the case of BPSK, "Max_DS_RE/N" mutual orthogonal sequences can be defined (e.g. if the region length is 8, then 8 mutually orthogonal sequences can be defined). If higher order modulation schemes can be used, for instance because of pilot bits are available for channel estimation, then the number of sequences that can be defined up-scales with the number of bits that are used in the modulation scheme (BPSK uses 1 bit, QPSK uses 2 bits, 16-QAM uses 4 bits, 64 QAM uses 6 bits, etc.)

For one particular embodiment described in this document, the size of each region is 32/4=8. No channel estimation can be used and BPSK is chosen as the modulation scheme. Without the loss of generality, 8 mutually orthogonal sequences with length 8 are defined as described in the table below.

TABLE 1

| sequence index | Sequence | | | | | | | |
|---|---|---|---|---|---|---|---|---|
| 0 | 1 | 1 | 1 | 1 | 1 | 1 | 1 | 1 |
| 1 | 1 | −1 | 1 | −1 | 1 | −1 | 1 | −1 |

TABLE 1-continued

| sequence index | Sequence | | | | | | | |
|---|---|---|---|---|---|---|---|---|
| 2 | 1 | 1 | -1 | -1 | 1 | 1 | -1 | -1 |
| 3 | 1 | -1 | -1 | 1 | 1 | -1 | -1 | 1 |
| 4 | 1 | 1 | 1 | 1 | -1 | -1 | -1 | -1 |
| 5 | 1 | -1 | 1 | -1 | -1 | 1 | -1 | 1 |
| 6 | 1 | 1 | -1 | -1 | -1 | -1 | 1 | 1 |
| 7 | 1 | -1 | -1 | 1 | -1 | 1 | 1 | -1 |

Mapping of Small Cells Discovery Signal to Sequences and Basic Regions

With the Discovery Signal, not only the existence of a Small Cell can be detected, but in the presence of multiple cells, also information which cell or cells that have been discovered can be revealed.

Therefore, different Small Cells may transmit with different sequences and on different regions.

Various embodiments can be realized where a cell transmits in all regions or on a sub-subset of the available regions. Another cell might then transmit on the same sub-set with a different sequence, or with the same sequence but on a different sub-set or also with a different sequence on a different region.

Thus, different cells can be distinguished in the time/frequency domain by transmitting in different regions, and/or they can also be distinguished in the code-domain by using different sequences (e.g., code-orthogonal sequences).

Within one region, multiple cells can be code-multiplexed. The maximum number of cells that can be code-multiplexed is equal to the number of sequences that are defined for that region. In the scheme proposed here, there are 8 different sequences defined. Thus, 8 cells could be code-multiplexed in one region.

In real world implementations, noise is unavoidable. A sequence can be considered to be detected (i.e. a cell can be considered to be discovered), if its measured energy is a certain threshold larger than the noise power. In order to measure the noise power, some of the defined sequences will be used. The other sequences can be used by the cells to transmit the discovery signal.

Different embodiments in which 1 cell up to the "number of available sequences" cells transmit code-multiplexed within one region can be realized.

Simulations performed by the inventors show that two cells per region using one sequence each result in a good performance. Therefore for the discovery signal scheme that is disclosed here, an embodiment is chosen where two cells transmit on one region. This means that the remaining 6 sequences are used for noise power estimation. Then, two other cells use the same sequences but in another region. In total, in this embodiment, there are 4 regions available. Thus, 8 cells can transmit a unique discovery signal during one sub-frame.

Let the 8 cells be denoted from "A" to "H". Both the region and sequence can be called a "transmission resource". In an example embodiment, the following Small Cell to transmission resource mapping is used.

Small Cell A transmits sequence #6 in the Upper Left region,

Small Cell B transmits sequence #7 in the Upper Left region,

Small Cell C transmits sequence #6 in the Lower Left region,

Small Cell D transmits sequence #7 in the Lower Left region,

Small Cell E transmits sequence #6 in the Upper Right region,

Small Cell F transmits sequence #7 in the Upper Right region,

Small Cell G transmits sequence #6 in the Lower Right region,

Small Cell H transmits sequence #7 in the Lower Right region

In other embodiments, other mappings can be selected. This is straight forward and not described here in detail for brevity.

Time-Multiplexed Transmission of More Cells

In the embodiment described above, 8 cells can be distinguished during one sub-frame. In other embodiments a different number, "K", can be distinguished during one sub-frame. The value for "K" depends on the selected parameters for DS-RE, GB-RE, number of sequences used and number of regions.

If the number of Small Cells to be discovered is larger than K, then in another embodiment, time-multiplexing of the different cells is performed. As an example, assume that K=8 and that there are 10 cells that shall be detected. Then, 5 cells could transmit during all even radio frames and the other 5 cells could transmit on the same resources during all odd radio frames.

Discovery Signal Reception in the UE

Out of the set of all available embodiments, the chosen numbers for region sizes have not only be selected for performance reasons, but also for the simple receiver that can be used on the UE side.

A simple detector with the following properties can be realized for discovery signal reception:

1. Exact 8 REs for each region
2. Perform an 8th-order Hadamard transform, obtaining 8 correlation outputs
3. Of 8 outputs, index 0~5 are used for noise power estimation
4. Check index 6 and 7
5. Define a threshold for signal detection
6. If power of index 6 or 7 is more than the threshold over the noise power, then consider the sequence to be detected.

The schemes that are described in this document are transmitting on the unused REs. However, in other embodiments, the same schemes can also be transmitted on other REs than the unused REs, e.g. on the PDSCH.

The schemes are described for one radio-frame containing two sub-frames with PSS/SSS. In other embodiments, similar schemes are used for just one sub-frame. As seen in FIG. 1, the number of unused REs in sub-frame is 20. By just using one upper and one lower region, the same schemes can be scaled to fit for one sub-frame.

In one beneficial aspect, the disclosed techniques are suitable for discovery of Cells that are in "off"-state.

In another beneficial aspect, discover signals can be transmitted on very few REs compared to legacy signals.

In one beneficial aspect, efficient support for intra-frequency cell detection is possible with the disclosed techniques.

In another beneficial aspect, efficient support for inter-frequency cell detection is possible.

It will be appreciated by one of skill in the art that zero overhead is introduced with the new physical discovery signal, at least because is transmitted on previously unused REs.

Another advantageous aspect is that the discovery signal causes no interference with legacy signals.

At the receiver side, a low complexity detector can be used without the need of estimating or compensating channel.

The "new" UEs can co-exists with legacy UEs. In some implementations, decimation filters for the cell search implementation can be designed to be less complex.

In some embodiments, a 128-point FFT can be used instead of possible 2048-point if the DS would be mapped to other REs (not PSS/SSS). This can reduce the power consumption of the UE in the process of discovering small cells Natural to have the discovery at the adhering positions to the PSS/SSS REs. The PSS/SSS can be considered as a legacy discovery signal.

Figure 3:
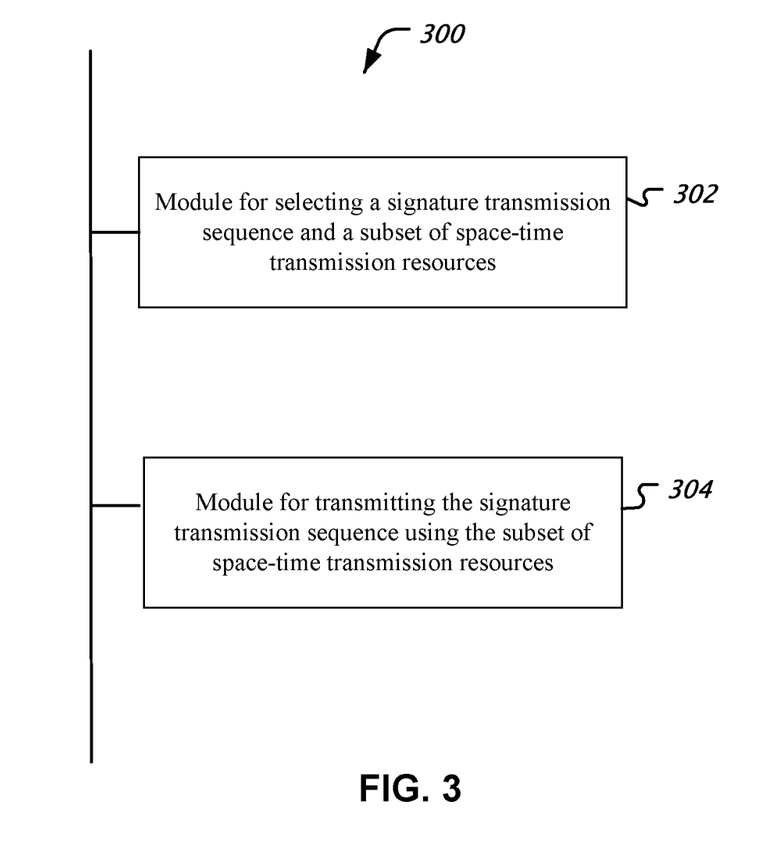
FIG. 3 is a block diagram of an example apparatus for transmitting discovery signals.

FIG. 3 is a flowchart representation of an example apparatus 300 that is operable in an OFDM communication system. The module 302 (e.g., a selector module) can select, from among a first plurality of available transmission sequences and a second plurality of space-time transmission resources, a signature transmission sequence and a subset of space-time transmission resources used to discover an identity of the apparatus in the OFDM communication system. The module 304 (e.g., a discovery signal transmission module) 304 can transmits the signature transmission sequence using the subset of space-time transmission resources.

In some embodiments, the selection of the signature transmission sequence (e.g., as listed in Table 1) and the subset of space-time resources may be unique to the apparatus 300 within the OFDM communication system. In some embodiments, the selection of the signature transmission sequence (e.g., as listed in Table 1) and the subset of space-time resources may not be unique to the apparatus 300 within the OFDM communication system. That is, there may be another LPN in the system that also transmits its discovery signals using the same transmission resources and signature sequence. However, in such a case, either the LPNs may be spatially isolated, thus avoiding causing interference with each other, or when these signals interfere, a UE at least can become aware of the presence of multiple small cells in an area and use other procedures to attach to either an LPN or the Macro node.

As described herein, in some embodiments, the second plurality of space-time transmission resources includes multiple REs, wherein at least some of the multiple REs are from a first transmission subframe and the remaining REs are from a second transmission subframe. Alternatively, in some embodiments, the multiple REs may all be from a single (first or second) transmission subframe.

In some embodiments, the second plurality of space-time transmission resources comprises multiple resource elements (REs), the multiple REs coinciding with guardband transmission resources for at least some user devices operable in the OFDM communication system. As previously describe, a legacy user device refrains from demodulating signals transmitted using guardband transmission resources and may use the knowledge about the guardband to design its processing elements (e.g., analog or digital filters) accordingly.

As disclosed herein, while Table 1 lists an example sequence for a BPSK embodiments, in general, each transmission sequence from the first plurality of available transmission sequences comprises values mappable to a constellation of a digital modulation scheme and wherein the discovery signal transmission module transmits the signature transmission sequence using the digital modulation scheme. In addition, the transmission sequences may also be orthogonal to each other, e.g., code division multiplexed.

Figure 4:
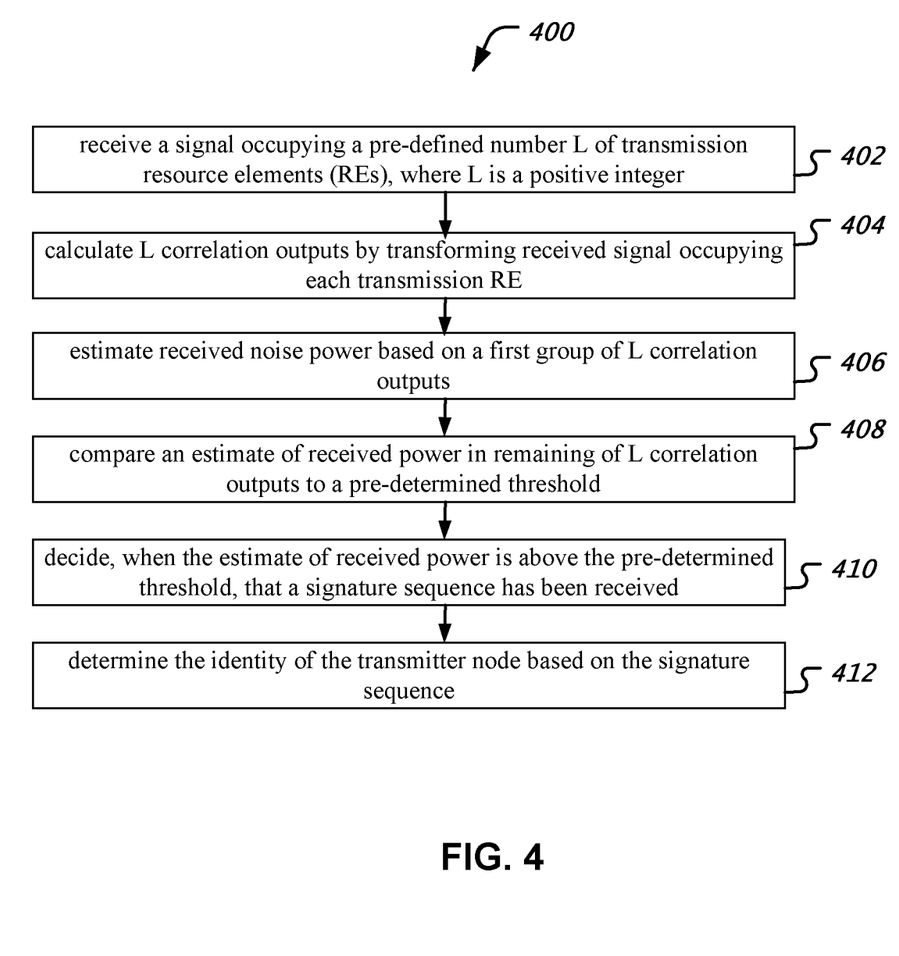
FIG. 4 is a flowchart representation of an example process of receiving discovery signals.

FIG. 4 is a flowchart representation of an example process 400 of signal reception to determine identity of a transmitter node. The process 400 may be implemented, e.g., a new UE (i.e., not a legacy UE) that has been designed to make use of the discovery signals disclosed in the present document.

At 402, the process 400 receives a signal occupying a pre-defined number L of transmission resource elements (REs), where L is a positive integer.

At 404, the process 400 calculates L correlation outputs by transforming received signal occupying each transmission RE.

At 406, the process 400 estimates received noise power based on a first group of L correlation outputs.

At 408, the process 400 compares an estimate of received power in remaining of L correlation outputs to a pre-determined threshold.

At 410, the process 400 decides, when the estimate of received power is above the pre-determined threshold, that a signature sequence has been received.

At 412, the process 400 determines the identity of the transmitter node based on the signature sequence.

Figure 5:
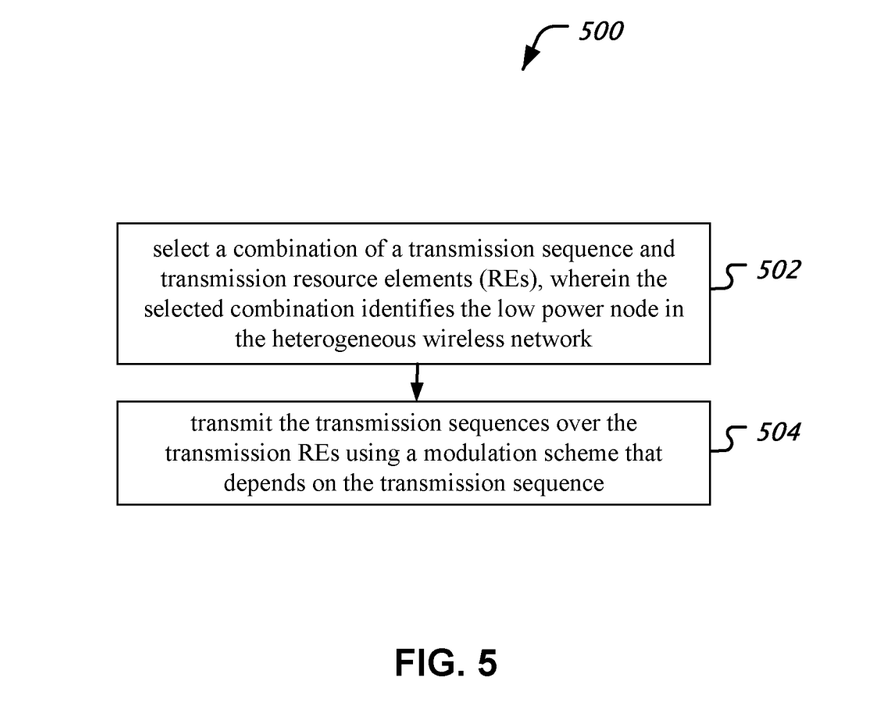
FIG. 5 is a flowchart representation of an example process of transmitting discovery signals.

FIG. 5 is a flowchart representation of an example process 500 for transmitting a discovery signal in a heterogeneous wireless communication network for advertising self-identity. The process 500 may be implemented at an LPN.

At 502, the process 500 selects a combination of a transmission sequence and transmission resource elements (REs), wherein the selected combination identifies the low power node in the heterogeneous wireless network. As previously discussed, the selected combination may be unique within a communication network or may not be unique. In some embodiments, the transmission REs are selected from a transmission guardband for at least some user equipment (e.g., legacy UEs). In some embodiments, the selected transmission REs belong to a group of REs occupying multiple guardband regions that are separated from each other in either frequency domain or time domain.

At 504, the process 500 transmits the transmission sequences over the transmission REs using a modulation scheme that depends on the transmission sequence.

Figure 6:
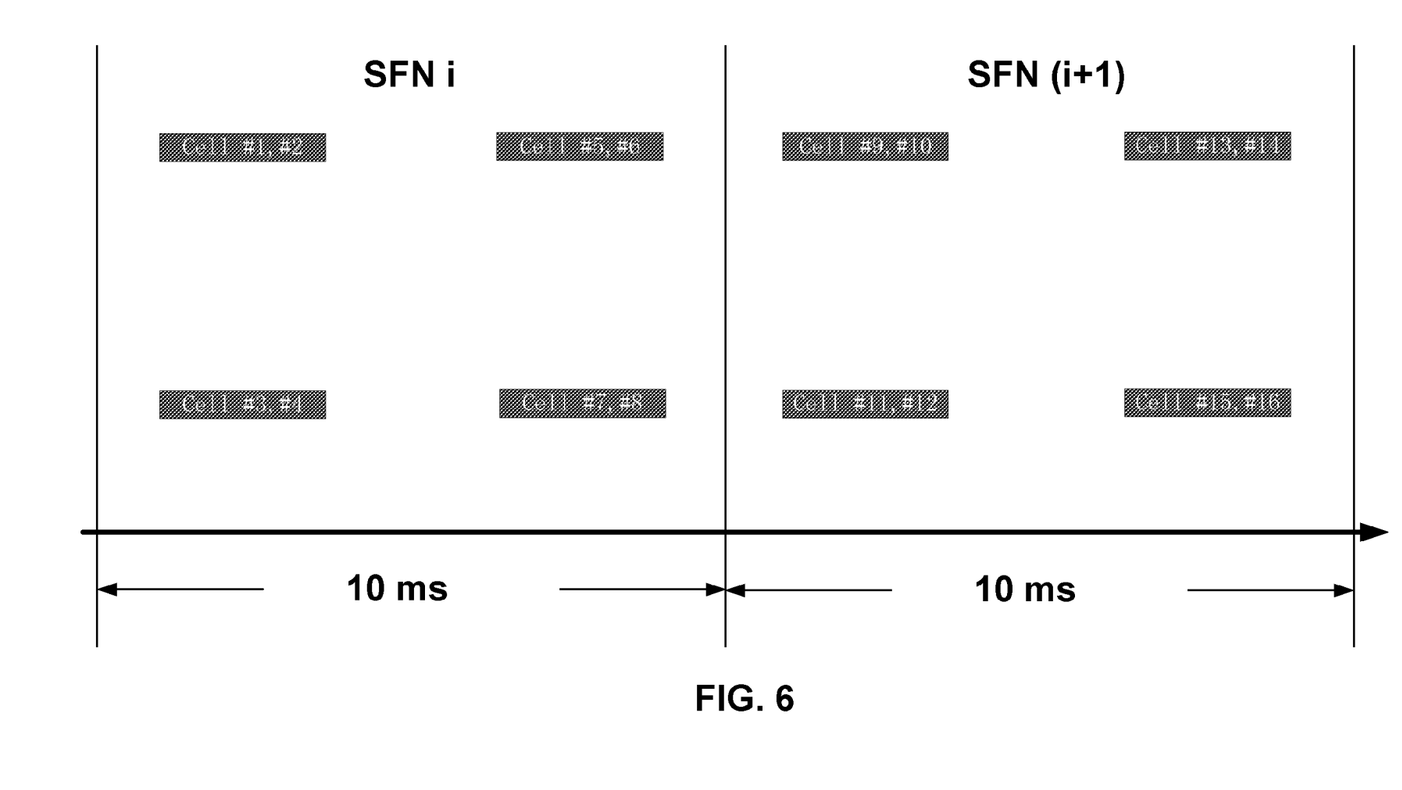
FIG. 6 illustrates one example when two sequences are used in a wireless network.

FIG. 6 illustrates one example when two sequences are used and that there are in total 16 small cells that transmit the discovery signal. As there can only be 8 cells/radio frame (two in each region) time multiplexing is used for the transmission of the 16 Companion Discover Signals (CDS), or simply referred to as discovery signal.

It will be appreciated that several techniques are disclosed for deployment of discovery signals in a heterogenous network. In one example, a heterogeneous network deployment includes a macro base station and one or more low power nodes, a discovery signal is transmitted to facilitate the identification of low power nodes. The discovery signal is transmitted on a selected subset of resource elements, previously unused, to maintain backward compatibility with legacy user equipment. The transmission sequence and/or the locations of resource elements used for transmitting the discovery signal can identify the low power node to a user equipment The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An apparatus operable in an orthogonal frequency division multiplexing (OFDM) communication system, comprising:
    a selector module to select, from among a first plurality of available transmission sequences and a second plurality of transmission resources, a signature transmission sequence and a subset of the second plurality of transmission resources, wherein the second plurality of transmission resources comprises multiple unused resource elements (REs) that are divided into one or more regions in time-frequency domain; and
    a discovery signal transmission module that transmits the signature transmission sequence using the subset of the second plurality of transmission resources such that the signature transmission sequence and the one or more regions identify the apparatus in the OFDM communication system.

2. The apparatus of claim 1, wherein the signature transmission sequence comprises a binary sequence.

3. The apparatus of claim 1, wherein the second plurality of transmission resources comprises multiple resource elements (REs), wherein at least some of the multiple REs are from a first transmission subframe and the remaining REs are from a second transmission subframe.

4. The apparatus of claim 1, wherein the second plurality of transmission resources comprises multiple resource elements (REs), the multiple REs coinciding with guardband transmission resources for at least some user devices operable in the OFDM communication system, wherein a user device refrains from demodulating signals transmitted using guardband transmission resources.

5. The apparatus of claim 1, wherein each transmission sequence from the first plurality of available transmission sequences comprises values mappable to a constellation of a digital modulation scheme and wherein the discovery signal transmission module transmits the signature transmission sequence using the digital modulation scheme.

6. The apparatus of claim 1, wherein the first plurality of transmission sequence are code division multiplexed.

7. A method of transmitting a discovery signal in a heterogeneous wireless communication network for advertising self-identity, implementable at a low power node, comprising:

selecting a combination of a transmission sequence and unused transmission resource elements (REs) that are divided into one or more regions in time-frequency domain, wherein the selected combination identifies the low power node in the heterogeneous wireless network; and transmitting the transmission sequence over the unused transmission REs using a modulation scheme that depends on the transmission sequence.

8. The method of claim 7, wherein the selecting the combination includes:

selecting the transmission REs from a transmission guardband for at least some user equipment.

9. The method of claim 7, wherein the selected transmission REs belong to a group of REs occupying multiple guardband regions that are separated from each other in either frequency domain or time domain.

10. A signal reception method for determining identity of a transmitter node, comprising:

receiving a signal occupying a pre-defined number L of transmission resource elements (REs), where L is a positive integer that is greater than one;

calculating L correlation outputs by transforming the signal occupying each transmission RE;

estimating a noise power based on a first group of L correlation outputs;

comparing an estimate of reception power in remaining of L correlation outputs to a pre-determined threshold associated with the noise power;

deciding, when the estimate of the reception power is above the pre-determined threshold, that a signature sequence has been received; and determining the identity of the transmitter node based on the signature sequence.

11. The method of claim 10, wherein the operation of calculating L correlation outputs comprises performing an L-th order Hadamard transform.

12. The method of claim 10, wherein the L transmission REs correspond to a guardband for legacy signal transmissions.

13. The method of claim 10, wherein the L transmission REs occupy a contiguous block of REs in a space-time plane.

14. A heterogeneous wireless communication system comprising a macro base station, at least one low power node (LPN) and a user equipment (UE), wherein the macro base station is operable to control at least some operation of the at least one LPN;

the at least one LPN is operable to transmit a discovery signal identifying the at least one LPN using a transmission sequence and a portion of pre-defined transmission resources that are divided into one or more regions in time-frequency domain but do not transmit demodulable signals; and the UE is operable to receive the discovery signal and identifies, based on the transmission sequence and the portion, the at least one LPN.

15. The heterogeneous wireless communication system of claim 14 further comprising another UE that is configured to refrain from demodulating signals transmitted over the pre-defined transmission resources.

* * * * *